(12) United States Patent
Zhang

(10) Patent No.: US 11,516,654 B2
(45) Date of Patent: Nov. 29, 2022

(54) METHOD FOR AUTOMATICALLY ENCRYPTING SHORT MESSAGE, STORAGE DEVICE AND MOBILE TERMINAL

(71) Applicant: JRD Communication (Shenzhen) LTD., Shenzhen (CN)

(72) Inventor: Min Zhang, Shenzhen (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 331 days.

(21) Appl. No.: 16/636,025

(22) PCT Filed: Aug. 2, 2018

(86) PCT No.: PCT/CN2018/098226
§ 371 (c)(1),
(2) Date: Feb. 3, 2020

(87) PCT Pub. No.: WO2019/024882
PCT Pub. Date: Feb. 7, 2019

(65) Prior Publication Data
US 2020/0245133 A1   Jul. 30, 2020

(30) Foreign Application Priority Data
Aug. 3, 2017 (CN) .......................... 201710657261.4

(51) Int. Cl.
*H04W 12/00* (2021.01)
*H04W 12/03* (2021.01)
(Continued)

(52) U.S. Cl.
CPC ............... *H04W 12/03* (2021.01); *H04L 9/16* (2013.01); *H04W 4/14* (2013.01)

(58) Field of Classification Search
CPC ..... H04W 12/03; H04W 4/14; H04W 12/033; H04W 4/12; H04W 12/02; H04L 9/16
See application file for complete search history.

(56) References Cited

U.S. PATENT DOCUMENTS 9,756,549 B2 * 9/2017 Perdomo ............... H04W 12/08
10,075,288 B1 * 9/2018 Khedr ..................... H04L 9/008
(Continued)

FOREIGN PATENT DOCUMENTS

| CN | 101252748 | 8/2008 |
| CN | 102065392 | 5/2011 |

(Continued)

OTHER PUBLICATIONS

International Search Report and the Written Opinion dated Oct. 24, 2018 From the International Searching Authority Re. Application No. PCT/CN2018/098226 and Its Translation of Search Report Into English. (10 Pages).

*Primary Examiner* — Abu S Sholeman

(57) ABSTRACT

Disclosed are a method for automatically encrypting a short message, a storage device and a mobile terminal. The method comprises: matching a number and content of a short message respectively with a pre-set short message encryption number group and a key word database; if the matching succeeds, performing encryption processing on the short message; and distributing the short message to an application program having the authority to monitor the short message. The short message content is encrypted before the application program receives the short message, preventing important information from being maliciously stolen by the application program.

4 Claims, 2 Drawing Sheets

(51) Int. Cl.
*H04L 9/16* (2006.01)
*H04W 4/14* (2009.01)

(56) References Cited

U.S. PATENT DOCUMENTS

| | | | |
|---|---|---|---|
| 2007/0130148 A1* | 6/2007 | Wu | G06F 21/604 |
| | | | 707/999.009 |
| 2009/0228873 A1* | 9/2009 | Drukman | G06F 11/3636 |
| | | | 717/129 |
| 2014/0079219 A1 | 3/2014 | Yigit et al. | |
| 2015/0326513 A1* | 11/2015 | Chiu | H04L 63/0428 |
| | | | 726/7 |
| 2018/0146081 A1* | 5/2018 | Brenner | H04M 1/6075 |

FOREIGN PATENT DOCUMENTS

| | | |
|---|---|---|
| CN | 105657678 | 6/2016 |
| CN | 106713618 | 5/2017 |
| CN | 107509180 | 12/2017 |
| WO | WO 2012/131659 | 10/2012 |
| WO | WO 2019/024882 | 2/2019 |

\* cited by examiner

METHOD FOR AUTOMATICALLY ENCRYPTING SHORT MESSAGE, STORAGE DEVICE AND MOBILE TERMINAL

RELATED APPLICATIONS

This application is a National Phase of PCT Patent Application No. PCT/CN2018/098226 having International filing date of Aug. 2, 2018, which claims the benefit of priority of Chinese Patent Application No. 201710657261.4 filed on Aug. 3, 2017. The contents of the above applications are all incorporated by reference as if fully set forth herein in their entirety.

FIELD AND BACKGROUND OF THE INVENTION

The present invention relates to a mobile terminal, and more particularly, to a method for automatically encrypting a message and a related storage device and mobile terminal.

Mobile terminals had become the production, entertainment, and communication tool in our daily life. The mobile terminal brings much convenience to our life.

Among the functions of the mobile terminal, sending/receiving messages is most common. The user may use this function in many scenarios. Many third-party applications could obtain contents of the message or execute other functions under the user's permission. However, the message may contain confidential information, such as verification codes. If the confidential information is stolen by malware, it may result in serious consequences.

Conventionally, the service provider encrypts the message and the encrypted message is sent to the mobile terminal to decrypt. Therefore, when the mobile terminal sends the message to the application, the content of the message could be viewed. This means that the application having the message monitoring authority could directly view the content of the message. Also, a malware may also monitor the content of the message to steal the user password or verification code. This may cause damage to the user.

Although some of the applications have the capability of encrypting the message, these applications do not encrypt the message before the message was sent to these applications. This means that the third party application could still steal the content of the message by monitoring the system interface and the purpose of securing confidential information is not met.

Therefore, this issue needs to be solved.

SUMMARY OF THE INVENTION

One objective of an embodiment of the present invention is to provide a method for automatically encrypting a message, a related storage device and mobile terminal to solve the above-mentioned issue that a malware may steal important information from the message and causes damages to the user.

According to an embodiment of the present invention, a method for automatically encrypting a message is disclosed. The method comprises:

utilizing a mobile terminal to identify and obtain a number and a content of the message and to match the number of the message with a predetermined message encrypting number set;

performing an encrypting operation on the message if the mobile terminal successfully matches the number of the message with the predetermined message encrypting number set; otherwise, utilizing the mobile terminal to match the content of the message with a predetermined keyword database and performing an encrypting operation if the content of the message contains a keyword; and utilizing the mobile terminal to send the message to all applications having a message monitoring authority.

Optionally, the method further comprises following steps before the step of utilizing the mobile terminal to identify and obtain the number and the content of the message and to match the number of the message with the predetermined message encrypting number set:

installing the predetermined message encrypting number set in the mobile terminal, wherein the predetermined message encrypting number set comprises a contact person code, which needs to be encrypted; and installing the predetermined keyword database in the mobile terminal, wherein the predetermined keyword database is configured to match with the content of the message to determine whether the content of the message contains important information.

Optionally, the method further comprises after the step of utilizing the mobile terminal to send the message to all applications having the message monitoring authority:

utilizing the applications to receive the message; and if the message is encrypted, utilizing a predetermined password to decrypt the encrypted message to show the content of the message.

Optionally, the step of utilizing the mobile terminal to identify and obtain the number and the content of the message and to match the number of the message with the predetermined message encrypting number set comprises:

utilizing the mobile terminal to receive the message and to identify and obtain the number of the message;

continuing identifying and obtaining the content of the message; and matching the number of the message with the predetermined message encrypting number set.

Optionally, the step of performing an encrypting operation on the message if the mobile terminal successfully matches the number of the message with the predetermined message encrypting number set; otherwise, utilizing the mobile terminal to match the content of the message with the predetermined keyword database and performing an encrypting operation if the content of the message contains a keyword comprises:

encrypting the content of the message through an encryption algorithm if the number of the message is in the predetermined message encrypting number set;

if the number of the message is not in the predetermined message encrypting number set, then matching the content of the message with the predetermined keyword database; and if the content of the message contains a keyword in the predetermined keyword database, then encrypting the content of the message through the encryption algorithm.

Optionally, the method further comprises a following step after the step of matching the content of the message with the predetermined keyword database:

when the content of the message does not contain any keyword of the predetermined keyword database, searching a local address book of the mobile terminal to determine whether the number of the message is in the local address book; if yes, encrypting the content of the message through an encryption algorithm.

Optionally, the step of sending the message to all applications having the message monitoring authority comprises:

obtaining registry information from all applications of the mobile terminal to know the applications having the message monitoring authority from the registry information; and sending the message to all applications having the message monitoring authority through a system interface of the mobile terminal.

Optionally, the method further comprises a following step before the step of sending the message to all applications having the message monitoring authority:

when an application is installed, presetting a function of the message monitoring authority of the application and storing the registry information of the preset application.

Another objective of an embodiment of the present invention is to provide a storage device storing a plurality of instructions executable by a processor to perform operations of:

utilizing a mobile terminal to identify and obtain a number and a content of the message and to match the number of the message with a predetermined message encrypting number set;

performing an encrypting operation on the message if the mobile terminal successfully matches the number of the message with the predetermined message encrypting number set; otherwise, utilizing the mobile terminal to match the content of the message with a predetermined keyword database and performing an encrypting operation if the content of the message contains a keyword; and utilizing the mobile terminal to send the message to all applications having a message monitoring authority.

Optionally, before the operation of utilizing the mobile terminal to identify and obtain the number and the content of the message and to match the number of the message with the predetermined message encrypting number set, the plurality of instructions are executable by the processor to perform operations of:

installing the predetermined message encrypting number set in the mobile terminal, wherein the predetermined message encrypting number set comprises a contact person code, which needs to be encrypted; and installing the predetermined keyword database in the mobile terminal, wherein the predetermined keyword database is configured to match with the content of the message to determine whether the content of the message contains important information.

Optionally, after the operation of utilizing the mobile terminal to send the message to all applications having the message monitoring authority, the plurality of instructions are executable by the processor to perform operations of:

utilizing the applications to receive the message; and if the message is encrypted, utilizing a predetermined password to decrypt the encrypted message to show the content of the message.

Optionally, the operation of utilizing the mobile terminal to identify and obtain the number and the content of the message and to match the number of the message with the predetermined message encrypting number set comprises:

utilizing the mobile terminal to receive the message and to identify and obtain the number of the message;

continuing identifying and obtaining the content of the message; and matching the number of the message with the predetermined message encrypting number set.

Optionally, the operation of performing an encrypting operation on the message if the mobile terminal successfully matches the number of the message with the predetermined message encrypting number set; otherwise, utilizing the mobile terminal to match the content of the message with the predetermined keyword database and performing an encrypting operation if the content of the message contains a keyword comprises:

encrypting the content of the message through an encryption algorithm if the number of the message is in the predetermined message encrypting number set;

if the number of the message is not in the predetermined message encrypting number set, then matching the content of the message with the predetermined keyword database; and if the content of the message contains a keyword in the predetermined keyword database, then encrypting the content of the message through the encryption algorithm.

Optionally, after the operation of matching the content of the message with the predetermined keyword database, the plurality of instructions are executable by the processor to perform operations of:

when the content of the message does not contain any keyword of the predetermined keyword database, searching a local address book of the mobile terminal to determine whether the number of the message is in the local address book; if yes, encrypting the content of the message through an encryption algorithm.

Optionally, the operation of sending the message to all applications having the message monitoring authority comprises:

obtaining registry information from all applications of the mobile terminal to know the applications having the message monitoring authority from the registry information.

Optionally, before the operation of sending the message to all applications having the message monitoring authority, the plurality of instructions are executable by the processor to perform operations of:

when an application is installed, presetting a function of the message monitoring authority of the application and storing the registry information of the preset application.

Still another objective of an embodiment of the present invention is to provide a mobile terminal. The mobile terminal includes a storage device configured to store a plurality of instructions, and a processor, electrically connected to the storage device, configured to execute the instructions to perform following operations:

utilizing a mobile terminal to identify and obtain a number and a content of the message and to match the number of the message with a predetermined message encrypting number set;

performing an encrypting operation on the message if the mobile terminal successfully matches the number of the message with the predetermined message encrypting number set; otherwise, utilizing the mobile terminal to match the content of the message with a predetermined keyword database and performing an encrypting operation if the content of the message contains a keyword;

if the number of the message is not in the predetermined message encrypting number set and the content of the message does not contain any keyword in the predetermined keyword database, then searching a local address book of the mobile terminal to determine whether the number of the message is in the address book; if the number of the message is in the address book, encrypting the content of the message through an encrypting algorithm and putting the number of the message into the message encrypting number set; and utilizing the mobile terminal to send the message to all applications having a message monitoring authority;

wherein the operation of utilizing the mobile terminal to send the message to all applications having the message monitoring authority comprises: obtaining registry information from all applications of the mobile terminal to know the applications having the message monitoring authority from the registry information; and send the message to all applications having the message monitoring authority through a system interface.

Optionally, after the operation of utilizing the mobile terminal to send the message to all applications having the message monitoring authority, the processor is configured to execute the instructions to perform following operations:

utilizing the applications to receive the message; and if the message is encrypted, utilizing a predetermined password to decrypt the encrypted message to show the content of the message.

Optionally, the operation of utilizing the mobile terminal to identify and obtain the number and the content of the message and to match the number of the message with the predetermined message encrypting number set comprises:

utilizing the mobile terminal to receive the message and to identify and obtain the number of the message;

continuing identifying and obtaining the content of the message; and matching the number of the message with the predetermined message encrypting number set.

Optionally, the operation of performing an encrypting operation on the message if the mobile terminal successfully matches the number of the message with the predetermined message encrypting number set; otherwise, utilizing the mobile terminal to match the content of the message with the predetermined keyword database and performing an encrypting operation if the content of the message contains a keyword comprises:

encrypting the content of the message through an encryption algorithm if the number of the message is in the predetermined message encrypting number set;

if the number of the message is not in the predetermined message encrypting number set, then matching the content of the message with the predetermined keyword database; and if the content of the message contains a keyword in the predetermined keyword database, then encrypting the content of the message through the encryption algorithm.

In contrast to the conventional art, an embodiment of the present invention matches the number and the content of the message respectively with the message encrypting number set and the keyword database before sending the message to the applications. If the match is successful, the message is encrypted and then is sent to the applications having the message monitoring authority. Thus, this ensures that the message could be encrypted before the application receives the message and the malware is not able to steal any information from the message. In other words, this mechanism protects the confidential information and prevents any possible damage caused by any stolen confidential information.

DETAILED DESCRIPTION OF PREFERRED SPECIFIC EMBODIMENTS OF THE INVENTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

Figure 1:
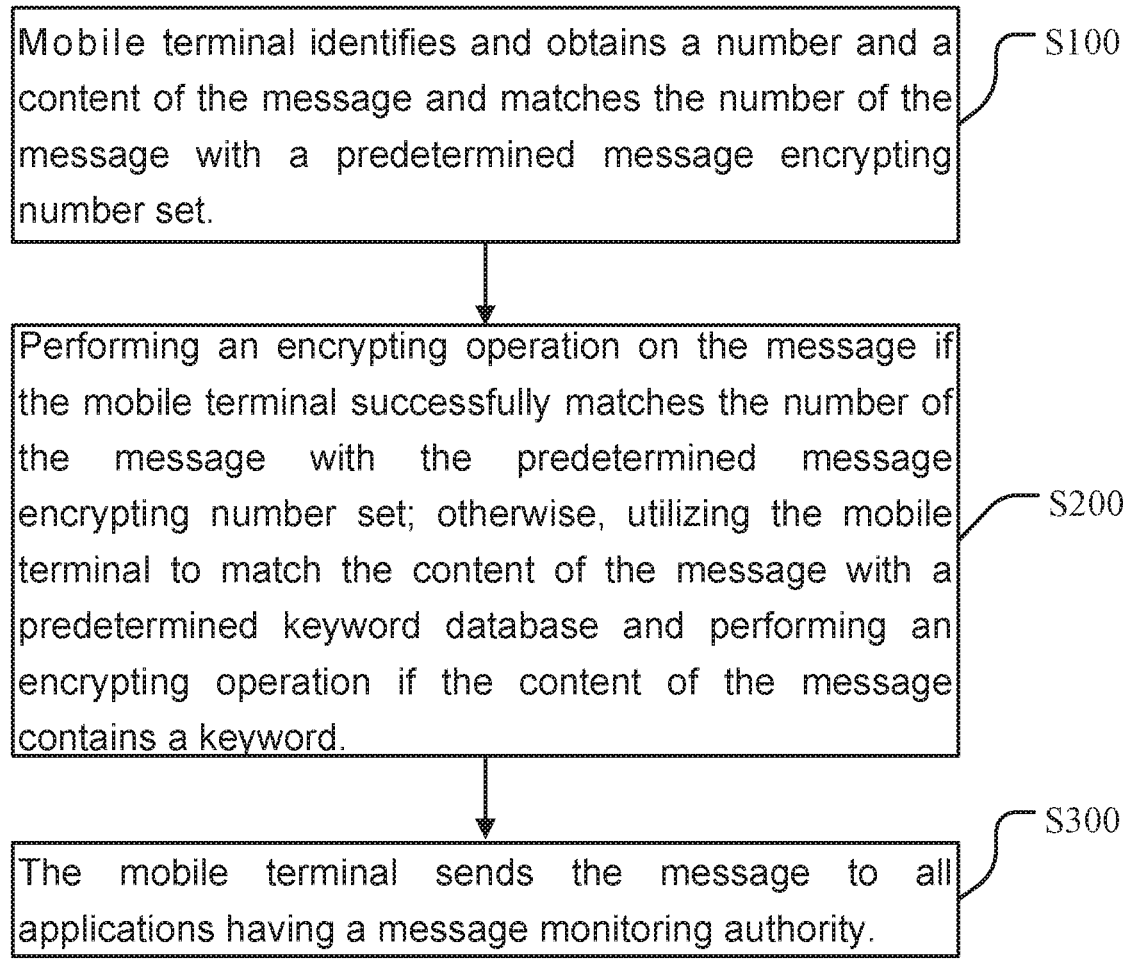
FIG. 1 is a flow chart of a method for automatically encrypting a message according to an embodiment of the present invention.

Please refer to FIG. 1. FIG. 1 is a flow chart of a method for automatically encrypting a message according to an embodiment of the present invention. The method for automatically encrypting a message comprises following steps:

Step S100: The mobile terminal identifies and obtains a number and a content of the message and matches the number of the message with a predetermined message encrypting number set.

The step S100 comprises:

Step S101: The mobile terminal receives the message and identifies and obtains the number and the content of the message.

Step S102: Continue identifying and obtaining the content of the message.

Step S103: Match the obtained number of the message with the message encrypting number set.

In order to better perform a targeted encryption on the message, an embodiment of the present invention preset a message encrypting number set in the mobile terminal. The message encrypting number set includes all the contact numbers that may require message encryption. Preferably, the user could select these contact numbers from its address book and move these contact numbers to the message encrypting number set. In addition, an embodiment of the present invention could preset a keyword database in the mobile terminal. The keyword database is used to match with the content of the message to determine whether the content of the message contains important/confidential information. For example, the keyword database could store keywords, such as "password", "verification code", "bank", etc. Through presetting the message encrypting number set and the keyword database, a targeted encryption could be performed on the message to prevent the mobile terminal from encrypting all the messages without purposes. This could reduce the workload of the mobile terminal.

When the mobile terminal receives the message, the mobile terminal identifies and obtains the number and the content of the message and matches the number of the message with the predetermined message encrypting number set. Because the predetermined message encrypting number set includes all the contact numbers that may require message encryption, the match is successful if the number of the received message is found to be in the predetermined message encrypting number set.

The method further comprises Step S200. Step S200: Performing an encrypting operation on the message if the mobile terminal successfully matches the number of the message with the predetermined message encrypting number set; otherwise, utilizing the mobile terminal to match the content of the message with a predetermined keyword database and performing an encrypting operation if the content of the message contains a keyword.

The step S200 comprises:

Step S201: encrypting the content of the message through an encryption algorithm if the number of the message is in the predetermined message encrypting number set.

Step S202: if the number of the message is not in the predetermined message encrypting number set, then matching the content of the message with the predetermined keyword database.

Step S203: if the content of the message contains a keyword in the predetermined keyword database, then encrypting the content of the message through the encryption algorithm.

If the number of the message is successfully matched with the predetermined message encrypting number set, it means that the message needs to be encrypted. Therefore, the message is encrypted through an encryption algorithm. If the number of the message cannot be matched with the predetermined message encrypting number set, then the mobile terminal matches the content of the message with the predetermined keyword database. For example, when a user is paying money, a bank sends a message containing a verification code to the mobile terminal. At this time, the message needs to be encrypted but the number of the bank may not be stored in the predetermined encrypting number set. Therefore, the content of the message is matched with the predetermined keyword database. Because the keyword database stores a lot of keywords, such as "password" or "verification code". If the content of the message contains any one of the keywords in the keyword database, the message is encrypted through the encryption algorithm. In the above example, because the message contains the keyword "verification code", the message is also encrypted. That is, an embodiment of the present invention could determine whether the message needs to be encrypted by matching the content of the message with the keyword database. If the content of the message is matched with the keyword database, it means that the message needs to be encrypted. In this case, the mobile terminal encrypts the message. In this way, the mobile terminal could encrypt the message when the message needs to be encrypted even if the number of the message is not in the predetermined encrypting number set. This ensures that a message that needs to be encrypted will be actually encrypted and brings convenience to the user.

It is possible that the keyword database may not be complete or the number a new important contact has not been stored in the predetermined message encrypting number. In this case, the message may need to be encrypted because the message contains confidential information but the number of the message is not in the predetermined message encrypting number and the content of the message does not contain any keyword in the keyword database. In order to solve this issue, the mobile terminal further searches the local address book to see if the number of the message is in the local address book. If the number is in the local address book, then the mobile terminal also encrypts the message. Preferably, the user could move the new important contact into the predetermined message encrypting number set as soon as possible such that the message could be well protected through the above-mentioned encryption mechanism.

The method further comprises Step S300: The mobile terminal sends the message to all applications having a message monitoring authority.

The step S300 comprises:

Step S301: Obtaining registry information from all applications of the mobile terminal to know the applications having the message monitoring authority from the registry information.

Step S302: Sending the message to all applications having a message monitoring authority through a system interface.

Because some application do not have or do not need to have the authority of monitoring messages (message monitoring authority), in order to send the message to the applications without any redundant operations, an embodiment of the present invention presets the function of message monitoring authority of applications and store the registry information of the applications. When the mobile terminal obtains the registry information from all the applications, the mobile terminal could easily know which applications have the message monitoring authority and sends the messages to these applications having the message monitoring authority through the system interface. The applications cannot view or obtain the encrypted content of the message. This prevents confidential information from being stolen by malware, ensures the information safety and avoids any possible damage due to the stolen information.

A preinstalled message application in the mobile terminal may receive the encrypted message, decrypt the encrypted message using a predetermined password and then show the content of the message to the user. Therefore, only the predetermined password could be used to access the encrypted message. Any other application or any other person cannot obtain the content of the message. This effectively protects the user's information and financial interest and brings convenience to the user.

Figure 2:
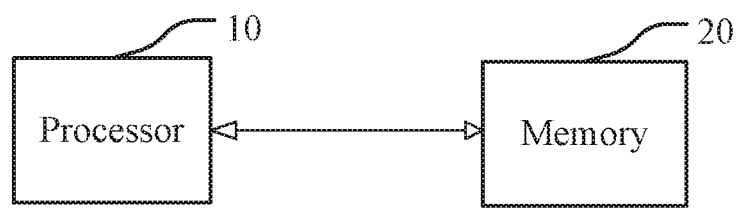
FIG. 2 is a functional block diagram of a mobile terminal according to an embodiment of the present invention.

Based on the above embodiment, a mobile terminal is further disclosed as shown in FIG. 2. The mobile terminal comprises a processor 10 and a memory 20. The memory 20 is used to store a plurality of instructions. The processor 10 is used to execute the instructions stored in the memory 20 to perform the above-mentioned method. For example, the processor 10 execute the instructions stored in the memory 20 to perform following steps:

Step S100: The mobile terminal identifies and obtains a number and a content of the message and matches the number of the message with a predetermined message encrypting number set.

Step S200: Performing an encrypting operation on the message if the mobile terminal successfully matches the number of the message with the predetermined message encrypting number set; otherwise, matching the content of the message with a predetermined keyword database and performing an encrypting operation if the content of the message contains a keyword.

Step S300: The mobile terminal sends the message to all applications having a message monitoring authority.

Furthermore, an embodiment of the present invention provides a storage device. The storage device stores a plurality of instructions for the processor to execute to perform the above-mentioned method.

Please note, one or more steps of the above-mentioned method could be achieved by instructing related hardware components (such as processor or controllers) through one or more programs. The above-mentioned programs could be stored in a computer readable storage medium such as a read-only memory (ROM), a random access memory (RAM), a hard disk, an optical disk or etc.

Figure 3:
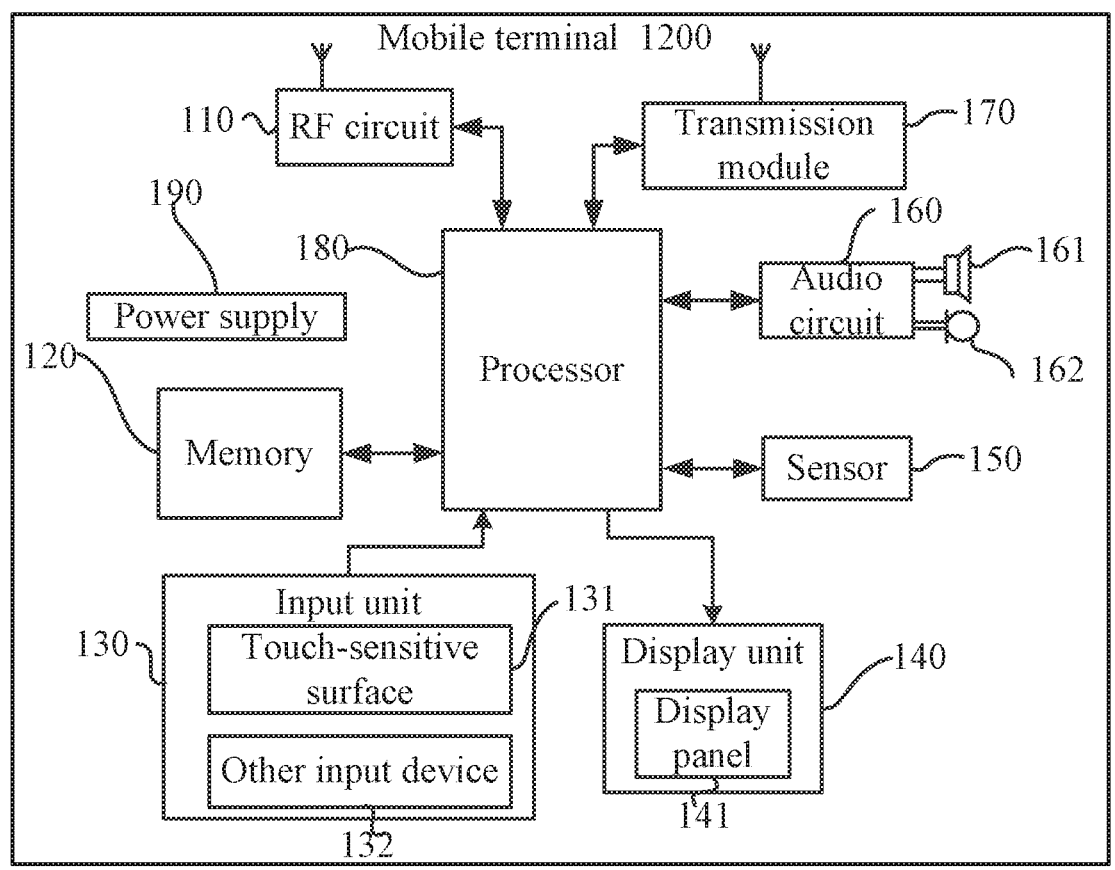
FIG. 3 is a diagram of a detailed structure of a mobile terminal according to an embodiment of the present invention.

FIG. 3 is a diagram of a detailed structure of a mobile terminal according to an embodiment of the present invention. The mobile terminal could be used to implement the above-mentioned method for automatically encrypting a message. The mobile terminal 1200 could be a smart phone or a tablet.

As shown in FIG. 3, the mobile terminal 1200 could comprise a radio frequency (RF) circuit 110, a storage device 120 having one or more computer readable storage media (only one is shown), an input unit 130, a display unit 140, a sensor 150, an audio circuit 160, a transmission module 170, a processor 180 having one or more cores (only one is shown), and a power supply 190. Please note, the structure of the mobile terminal 1200 of this embodiment should be regarded as an example, not a limitation of the present invention. In the actual implementation, less or more components could be included in the mobile terminal or different arrangement could be implemented. These changes all belong to the scope of the present invention.

The RF circuit 110 may be configured to receive and send a signal during an information receiving and sending process or a conversation process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 120 may include a high speed random access memory, and may also include a non-volatile memory, such as at least one magnetic disk storage device, a flash memory device, or another volatile solid-state storage device. Correspondingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and other input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 1200. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 3, the touch-sensitive surface 131 and the display panel 141 are used as two separate parts to implement input and output functions, in some embodiments, the touch-sensitive surface 131 and the display panel 141 may be integrated to implement the input and output functions.

The terminal 1200 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1200 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the terminal 1200 are not further described herein.

The audio circuit 160, a loudspeaker 161, and a microphone 162 may provide audio interfaces between the user and the terminal 1200. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1200.

The terminal 1200 may help, by using the transmission module 170 (e.g. Wi-Fi module), a user to receive and send an e-mail, browse a webpage, and access stream media, and the like, which provides wireless broadband Internet access for the user. Although FIG. 3 shows the transmission module 170, it may be understood that, the wireless communications unit is not a necessary component of the terminal 1200, and can be ignored according to demands without changing the scope of the essence of the present disclosure.

The processor 180 is a control center of the terminal 1200, and connects various parts of the terminal by using various interfaces and lines. By running or executing the software program and/or module stored in the memory 120, and invoking data stored in the memory 120, the processor 180 performs various functions and data processing of the terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may not be integrated into the processor 180.

The terminal 1200 further includes the power supply 190 (such as a battery) for supplying power to the components. Preferably, the power supply may be logically connected to the processor 180 by using a power supply management system, thereby implementing functions, such as charging, discharging, and power consumption management, by using the power supply management system. The power supply 190 may further include any component, such as one or more direct current or alternate current power supplies, a re-charging system, a power supply fault detection circuit, a power supply converter or an inverter, and a power supply state indicator.

The mobile terminal 1200 could further comprise a camera (such as front camera or back camera) or a Bluetooth module. In this embodiment, the display unit of the mobile terminal is a touch panel. The mobile terminal further comprises a storage device and one or more programs (instructions) stored in the storage device. These programs (instructions) are executed by one or more processors to perform following operations:

utilizing a mobile terminal to identify and obtain a number and a content of the message and to match the number of the message with a predetermined message encrypting number set;

performing an encrypting operation on the message if the mobile terminal successfully matches the number of the message with the predetermined message encrypting number set; otherwise, utilizing the mobile terminal to match the content of the message with a predetermined keyword database and performing an encrypting operation if the content of the message contains a keyword;

if the number of the message is not in the predetermined message encrypting number set and the content of the message does not contain any keyword in the predetermined keyword database, then searching a local address book of the mobile terminal to determine whether the number of the message is in the address book; if the number of the message is in the address book, encrypting the content of the message through an encrypting algorithm and putting the number of the message into the message encrypting number set; and utilizing the mobile terminal to send the message to all applications having a message monitoring authority; wherein the operation of utilizing the mobile terminal to send the message to all applications having the message monitoring authority comprises: obtaining registry information from all applications of the mobile terminal to know the applications having the message monitoring authority from the registry information; and send the message to all applications having the message monitoring authority through a system interface.

In the mobile terminal, after the operation of utilizing the mobile terminal to send the message to all applications having the message monitoring authority, the processor is configured to execute the instructions to perform following operations:

utilizing the applications to receive the message; and if the message is encrypted, utilizing a predetermined password to decrypt the encrypted message to show the content of the message.

In the mobile terminal, the operation of utilizing the mobile terminal to identify and obtain the number and the content of the message and to match the number of the message with the predetermined message encrypting number set comprises:

utilizing the mobile terminal to receive the message and to identify and obtain the number of the message;

continuing identifying and obtaining the content of the message; and matching the number of the message with the predetermined message encrypting number set.

In the mobile terminal, the operation of performing an encrypting operation on the message if the mobile terminal successfully matches the number of the message with the predetermined message encrypting number set; otherwise, utilizing the mobile terminal to match the content of the message with the predetermined keyword database and performing an encrypting operation if the content of the message contains a keyword comprises:

encrypting the content of the message through an encryption algorithm if the number of the message is in the predetermined message encrypting number set;

if the number of the message is not in the predetermined message encrypting number set, then matching the content of the message with the predetermined keyword database; and if the content of the message contains a keyword in the predetermined keyword database, then encrypting the content of the message through the encryption algorithm.

In sum, the present disclosure proposes a method for automatically encrypting a message, a related storage device and mobile terminal. The method includes: utilizing a mobile terminal to identify and obtain a number and a content of the message and to match the number of the message with a predetermined message encrypting number set; performing an encrypting operation on the message if the mobile terminal successfully matches the number of the message with the predetermined message encrypting number set; otherwise, utilizing the mobile terminal to match the content of the message with a predetermined keyword database and performing an encrypting operation if the content of the message contains a keyword; and utilizing the mobile terminal to send the message to all applications having a message monitoring authority. The present invention matches the number and the content of the message respectively with the message encrypting number set and the keyword database before sending the message to the applications. If the match is successful, the message is encrypted and then is sent to the applications having the message monitoring authority. Thus, this ensures that the message could be encrypted before the application receives the message and the malware is not able to steal any information from the message. In other words, this mechanism protects the confidential information and prevents any possible damage caused by any stolen confidential information.

Above are embodiments of the present invention, which does not limit the scope of the present invention. Any modifications, equivalent replacements or improvements within the spirit and principles of the embodiment described above should be covered by the protected scope of the invention.

What is claimed is:

1. A mobile terminal comprising:
    a storage device, configured to store a plurality of instructions; and
    a processor, electrically connected to the storage device, configured to execute the instructions to perform following operations:
    utilizing a mobile terminal to identify and obtain a number and a content of the message and to match the number of the message with a predetermined message encrypting number set;
    performing an encrypting operation on the message if the mobile terminal successfully matches the number of the message with the predetermined message encrypting number set; otherwise, utilizing the mobile terminal to match the content of the message with a predetermined keyword database and performing an encrypting operation if the content of the message contains a keyword;
    if the number of the message is not in the predetermined message encrypting number set and the content of the message does not contain any keyword in the predetermined keyword database, then searching a local address book of the mobile terminal to determine whether the number of the message is in the address book;
    if the number of the message is in the address book, encrypting the content of the message through an encrypting algorithm and putting the number of the message into the message encrypting number set; and
    utilizing the mobile terminal to send the message to all applications having a message monitoring authority;
    wherein the operation of utilizing the mobile terminal to send the message to all applications having the message monitoring authority comprises:
    obtaining registry information from all applications of the mobile terminal to know the applications having the message monitoring authority from the registry information; and
    send the message to all applications having the message monitoring authority through a system interface.

2. The mobile terminal of claim 1, wherein after the operation of utilizing the mobile terminal to send the message to all applications having the message monitoring authority, the processor is configured to execute the instructions to perform following operations:
    utilizing the applications to receive the message; and
    if the message is encrypted, utilizing a predetermined password to decrypt the encrypted message to show the content of the message.

3. The mobile terminal of claim 1, wherein the operation of utilizing the mobile terminal to identify and obtain the number and the content of the message and to match the number of the message with the predetermined message encrypting number set comprises:
    utilizing the mobile terminal to receive the message and to identify and obtain the number of the message;
    continuing identifying and obtaining the content of the message; and
    matching the number of the message with the predetermined message encrypting number set.

4. The mobile terminal of claim 1, wherein the operation of performing an encrypting operation on the message if the mobile terminal successfully matches the number of the message with the predetermined message encrypting number set; otherwise, utilizing the mobile terminal to match the content of the message with the predetermined keyword database and performing an encrypting operation if the content of the message contains a keyword comprises:
    encrypting the content of the message through an encryption algorithm if the number of the message is in the predetermined message encrypting number set;
    if the number of the message is not in the predetermined message encrypting number set, then matching the content of the message with the predetermined keyword database; and
    if the content of the message contains a keyword in the predetermined keyword database, then encrypting the content of the message through the encryption algorithm.

* * * * *